United States Patent [19]
Schmidt

[11] 3,721,812
[45] March 20, 1973

[54] FAST FOURIER TRANSFORM COMPUTER AND METHOD FOR SIMULTANEOUSLY PROCESSING TWO INDEPENDENT SETS OF DATA

[75] Inventor: Ralph Otto Schmidt, Santa Ana, Calif.

[73] Assignee: Interstate Electronics Corporation, Anaheim, Calif.

[22] Filed: March 29, 1971

[21] Appl. No.: 128,915

[52] U.S. Cl. ....................235/156
[51] Int. Cl. ....................G06f 7/38, G06f 15/34
[58] Field of Search ............235/156; 324/77 G, 77 H

[56] References Cited

UNITED STATES PATENTS 3,588,460 6/1971 Smith ....................235/156
3,544,775 12/1970 Bergland ....................235/156 X
3,573,446 4/1971 Bergland ....................235/156

*Primary Examiner*—Malcolm A. Morrison
*Assistant Examiner*—David H. Malzahn
*Attorney*—Fowler, Knobbe & Martens

[57] ABSTRACT

Special purpose computing equipment is utilized to perform the Fast Fourier Transform algorithm. The computing equipment utilizes serial access memory for storing coefficients during interim periods between calculations and by properly alternating between two clock rates for the serial memory, the computer allows the processing of two Fast Fourier Transform algorithms simultaneously when the input data for the two algorithms is in different binary order.

22 Claims, 8 Drawing Figures

INVENTOR.
RALPH O. SCHMIDT
BY
FOWLER, KNOBBE & MARTENS
ATTORNEYS.

INVENTOR.
RALPH O. SCHMIDT

BY
FOWLER, KNOBBE & MARTENS
ATTORNEYS.

INVENTOR.
RALPH O. SCHMIDT
BY
FOWLER, KNOBBE & MARTENS
ATTORNEYS.

INVENTOR.
RALPH O. SCHMIDT
BY
FOWLER, KNOBBE
& MARTENS
ATTORNEYS.

INVENTOR.
RALPH O. SCHMIDT

BY
FOWLER, KNOBBE
& MARTENS
ATTORNEYS.

INVENTOR.
RALPH O. SCHMIDT
BY
FOWLER, KNOBBE & MARTENS
ATTORNEYS.

| TIME ½ μ SEC. | SWITCH 114 | REGISTER A | | | | CLOCK RATE MC | | REGISTER B | | | | SWITCH POS. | | REGISTER C | | | | CLOCK RATE MC | | REGISTER D | | | |
|---|---|---|---|---|---|---|---|---|---|---|---|---|---|---|---|---|---|---|---|---|---|---|---|
| | | WORD a | WORD b | WORD c | WORD d | REGISTER A | REGISTER B | WORD a | WORD b | WORD c | WORD d | SWITCH 94 | SWITCH 112 | WORD a | WORD b | WORD c | WORD d | REGISTER C | REGISTER D | WORD a | WORD b | WORD c | WORD d |
| 1 | I | $X_0$ | | | | 2 | 0 | | | | | I | | $A_0$ | | | | 2 | 0 | | | | |
| 2 | II | $X_1$ | $X_0$ | | | 2 | 0 | | | | | I | | $A_4$ | $A_0$ | | | 2 | 0 | | | | |
| 3 | I | $X_2$ | $X_1$ | $X_0$ | | 2 | 0 | | | | | I | | $A_2$ | $A_4$ | $A_0$ | | 2 | 0 | | | | |
| 4 | II | $X_3$ | $X_2$ | $X_1$ | $X_0$ | 2 | 0 | | | | | I | | $A_6$ | $A_2$ | $A_4$ | $A_0$ | 2 | 0 | | | | |
| 5 | I | $X_3$ | $X_2$ | $X_1$ | $X_0$ | 0 | 2 | $X_4$ | | | | I | | $A_6$ | $A_2$ | $A_4$ | $A_0$ | 0 | 2 | $A_1$ | | | |
| 6 | II | $X_3$ | $X_2$ | $X_1$ | $X_0$ | 0 | 2 | $X_5$ | $X_4$ | | | I | | $A_6$ | $A_2$ | $A_4$ | $A_0$ | 0 | 2 | $A_5$ | $A_1$ | | |
| 7 | I | $X_3$ | $X_2$ | $X_1$ | $X_0$ | 0 | 2 | $X_6$ | $X_5$ | $X_4$ | | I | | $A_6$ | $A_2$ | $A_4$ | $A_0$ | 0 | 2 | $A_3$ | $A_5$ | $A_1$ | |
| 8 | II | $X_3$ | $X_2$ | $X_1$ | $X_0$ | 0 | 2 | $X_7$ | $X_6$ | $X_5$ | $X_4$ | I | | $A_6$ | $A_2$ | $A_4$ | $A_0$ | 0 | 2 | $A_7$ | $A_3$ | $A_5$ | $A_1$ |
| 9 | I | | $X_3$ | $X_2$ | $X_1$ | 1 | 1 | | $X_7$ | $X_6$ | $X_5$ | II | I | $X_{a0}$ | $A_6$ | $A_2$ | $A_4$ | 2 | 0 | $A_7$ | $A_3$ | $A_5$ | $A_1$ |
| 10 | II | $A_{a0}$ | $X_3$ | $X_2$ | $X_1$ | 1 | 1 | $A_{a4}$ | $X_7$ | $X_6$ | $X_5$ | II | I | $X_{a4}$ | $X_{a0}$ | $A_6$ | $A_2$ | 2 | 0 | $A_7$ | $A_3$ | $A_5$ | $A_1$ |
| 11 | I | | $A_{a0}$ | $X_3$ | $X_2$ | 1 | 1 | | $A_{a4}$ | $X_7$ | $X_6$ | II | I | $X_{a1}$ | $X_{a4}$ | $X_{a0}$ | $A_6$ | 2 | 0 | $A_7$ | $A_3$ | $A_5$ | $A_1$ |
| 12 | II | $A_{a2}$ | $A_{a0}$ | $X_3$ | $X_2$ | 1 | 1 | $A_{a6}$ | $A_{a4}$ | $X_7$ | $X_6$ | II | I | $X_{a5}$ | $X_{a1}$ | $X_{a4}$ | $X_{a0}$ | 2 | 0 | $A_7$ | $A_3$ | $A_5$ | $A_1$ |
| 13 | I | | $A_{a2}$ | $A_{a0}$ | $X_3$ | 1 | 1 | | $A_{a6}$ | $A_{a4}$ | $X_7$ | II | I | $X_{a5}$ | $X_{a1}$ | $X_{a4}$ | $X_{a0}$ | 0 | 2 | $X_{a2}$ | $A_7$ | $A_5$ | $A_1$ |
| 14 | II | $A_{a1}$ | $A_{a2}$ | $A_{a0}$ | $X_3$ | 1 | 1 | $A_{a5}$ | $A_{a6}$ | $A_{a4}$ | $X_7$ | II | I | $X_{a5}$ | $X_{a1}$ | $X_{a4}$ | $X_{a0}$ | 0 | 2 | $X_{a6}$ | $X_{a2}$ | $A_7$ | $A_5$ |
| 15 | I | | $A_{a1}$ | $A_{a2}$ | $A_{a0}$ | 1 | 1 | | $A_{a5}$ | $A_{a6}$ | $A_{a4}$ | II | I | $X_{a5}$ | $X_{a1}$ | $X_{a4}$ | $X_{a0}$ | 0 | 2 | $X_{a3}$ | $X_{a6}$ | $X_{a2}$ | $A_7$ |
| 16 | II | $A_{a3}$ | $A_{a1}$ | $A_{a2}$ | $A_{a0}$ | 1 | 1 | $A_{a7}$ | $A_{a5}$ | $A_{a6}$ | $A_{a4}$ | II | I | $X_{a5}$ | $X_{a1}$ | $X_{a4}$ | $X_{a0}$ | 0 | 2 | $X_{a7}$ | $X_{a3}$ | $X_{a6}$ | $X_{a2}$ |
| 17 | I | $X_{b0}$ | $A_{a3}$ | $A_{a1}$ | $A_{a2}$ | 2 | 0 | $A_{a7}$ | $A_{a5}$ | $A_{a6}$ | $A_{a4}$ | II | II | | $X_{a5}$ | $X_{a1}$ | $X_{a4}$ | 1 | 1 | | $X_{a7}$ | $X_{a3}$ | $X_{a6}$ |
| 18 | II | $X_{b2}$ | $X_{b0}$ | $A_{a3}$ | $A_{a1}$ | 2 | 0 | $A_{a7}$ | $A_{a5}$ | $A_{a6}$ | $A_{a4}$ | II | II | $A_{b0}$ | $X_{a5}$ | $X_{a1}$ | $X_{a4}$ | 1 | 1 | $A_{b2}$ | $X_{a7}$ | $X_{a3}$ | $X_{a6}$ |
| 19 | I | $X_{b4}$ | $X_{b2}$ | $X_{b0}$ | $A_{a3}$ | 2 | 0 | $A_{a7}$ | $A_{a5}$ | $A_{a6}$ | $A_{a4}$ | II | II | | $A_{b0}$ | $X_{a5}$ | $X_{a1}$ | 1 | 1 | | $A_{b2}$ | $X_{a7}$ | $X_{a3}$ |
| 20 | II | $X_{b6}$ | $X_{b4}$ | $X_{b2}$ | $X_{b0}$ | 2 | 0 | $A_{a7}$ | $A_{a5}$ | $A_{a6}$ | $A_{a4}$ | II | II | $A_{b1}$ | $A_{b0}$ | $X_{a5}$ | $X_{a1}$ | 1 | 1 | $A_{b3}$ | $A_{b2}$ | $X_{a7}$ | $X_{a3}$ |
| 21 | I | $X_{b6}$ | $X_{b4}$ | $X_{b2}$ | $X_{b0}$ | 0 | 2 | $X_{b1}$ | $A_{a7}$ | $A_{a5}$ | $A_{a6}$ | II | II | | $A_{b1}$ | $A_{b0}$ | $X_{a5}$ | 1 | 1 | | $A_{b3}$ | $A_{b2}$ | $X_{a7}$ |
| 22 | II | $X_{b6}$ | $X_{b4}$ | $X_{b2}$ | $X_{b0}$ | 0 | 2 | $X_{b3}$ | $X_{b1}$ | $A_{a7}$ | $A_{a5}$ | II | II | $A_{b4}$ | $A_{b1}$ | $A_{b0}$ | $X_{a5}$ | 1 | 1 | $A_{b6}$ | $A_{b3}$ | $A_{b2}$ | $X_{a7}$ |
| 23 | I | $X_{b6}$ | $X_{b4}$ | $X_{b2}$ | $X_{b0}$ | 0 | 2 | $X_{b5}$ | $X_{b3}$ | $X_{b1}$ | $A_{a7}$ | II | II | | $A_{b4}$ | $A_{b1}$ | $A_{b0}$ | 1 | 1 | | $A_{b6}$ | $A_{b3}$ | $A_{b2}$ |
| 24 | II | $X_{b6}$ | $X_{b4}$ | $X_{b2}$ | $X_{b0}$ | 0 | 2 | $X_{b7}$ | $X_{b5}$ | $X_{b3}$ | $X_{b1}$ | II | II | $A_{b5}$ | $A_{b4}$ | $A_{b1}$ | $A_{b0}$ | 1 | 1 | $A_{b7}$ | $A_{b6}$ | $A_{b3}$ | $A_{b2}$ |
| 25 | I | | $X_{b6}$ | $X_{b4}$ | $X_{b2}$ | 1 | 1 | | $X_{b7}$ | $X_{b5}$ | $X_{b3}$ | II | I | $A'_0$ | $A_{b5}$ | $A_{b4}$ | $A_{b1}$ | 2 | 0 | $A_{b7}$ | $A_{b6}$ | $A_{b3}$ | $A_{b2}$ |
| 26 | II | $X'_0$ | $X_{b6}$ | $X_{b4}$ | $X_{b2}$ | 1 | 1 | $X'_1$ | $X_{b7}$ | $X_{b5}$ | $X_{b3}$ | II | I | $A'_1$ | $A'_0$ | $A_{b5}$ | $A_{b4}$ | 2 | 0 | $A_{b7}$ | $A_{b6}$ | $A_{b3}$ | $A_{b2}$ |
| 27 | I | | $X'_0$ | $X_{b6}$ | $X_{b4}$ | 1 | 1 | | $X'_1$ | $X_{b7}$ | $X_{b5}$ | II | I | $A'_2$ | $A'_1$ | $A'_0$ | $A_{b5}$ | 2 | 0 | $A_{b7}$ | $A_{b6}$ | $A_{b3}$ | $A_{b2}$ |
| 28 | II | $X'_4$ | $X'_0$ | $X_{b6}$ | $X_{b4}$ | 1 | 1 | $X'_5$ | $X'_1$ | $X_{b7}$ | $X_{b5}$ | II | I | $A'_3$ | $A'_2$ | $A'_1$ | $A'_0$ | 2 | 0 | $A_{b7}$ | $A_{b6}$ | $A_{b3}$ | $A_{b2}$ |
| 29 | I | | $X'_4$ | $X'_0$ | $X_{b6}$ | 1 | 1 | | $X'_5$ | $X'_1$ | $X_{b7}$ | II | I | $A'_3$ | $A'_2$ | $A'_1$ | $A'_0$ | 0 | 2 | $A'_4$ | $A_{b7}$ | $A_{b6}$ | $A_{b3}$ |
| 30 | II | $X'_2$ | $X'_4$ | $X'_0$ | $X_{b6}$ | 1 | 1 | $X'_3$ | $X'_5$ | $X'_1$ | $X_{b7}$ | II | I | $A'_3$ | $A'_2$ | $A'_1$ | $A'_0$ | 0 | 2 | $A'_5$ | $A'_4$ | $A_{b7}$ | $A_{b6}$ |
| 31 | I | | $X'_2$ | $X'_4$ | $X'_0$ | 1 | 1 | | $X'_3$ | $X'_5$ | $X'_1$ | II | I | $A'_3$ | $A'_2$ | $A'_1$ | $A'_0$ | 0 | 2 | $A'_6$ | $A'_5$ | $A'_4$ | $A_{b7}$ |
| 32 | II | $X'_6$ | $X'_2$ | $X'_4$ | $X'_0$ | 1 | 1 | $X'_7$ | $X'_3$ | $X'_5$ | $X'_1$ | II | I | $A'_3$ | $A'_2$ | $A'_1$ | $A'_0$ | 0 | 2 | $A'_7$ | $A'_6$ | $A'_5$ | $A'_4$ |
| 33 | I | | $X'_6$ | $X'_2$ | $X'_4$ | 2 | 0 | $X'_7$ | $X'_3$ | $X'_5$ | $X'_1$ | I | | | $A'_3$ | $A'_2$ | $A'_1$ | 2 | 0 | $A'_7$ | $A'_6$ | $A'_5$ | $A'_4$ |
| 34 | II | | | $X'_6$ | $X'_2$ | 2 | 0 | $X'_7$ | $X'_3$ | $X'_5$ | $X'_1$ | I | | | | $A'_3$ | $A'_2$ | 2 | 0 | $A'_7$ | $A'_6$ | $A'_5$ | $A'_4$ |
| 35 | I | | | | $X'_6$ | 2 | 0 | $X'_7$ | $X'_3$ | $X'_5$ | $X'_1$ | I | | | | | $A'_3$ | 2 | 0 | $A'_7$ | $A'_6$ | $A'_5$ | $A'_4$ |
| 36 | II | | | | | 2 | 0 | $X'_7$ | $X'_3$ | $X'_5$ | $X'_1$ | I | | | | | | 2 | 0 | $A'_7$ | $A'_6$ | $A'_5$ | $A'_4$ |
| 37 | I | | | | | 0 | 2 | | $X'_7$ | $X'_3$ | $X'_5$ | I | | | | | | 0 | 2 | | $A'_7$ | $A'_6$ | $A'_5$ |
| 38 | II | | | | | 0 | 2 | | | $X'_7$ | $X'_3$ | I | | | | | | 0 | 2 | | | $A'_7$ | $A'_6$ |
| 39 | I | | | | | 0 | 2 | | | | $X'_7$ | I | | | | | | 0 | 2 | | | | $A'_7$ |
| 40 | II | | | | | 0 | 2 | | | | | I | | | | | | 0 | 2 | | | | |

FIG. 8.

INVENTOR
RALPH O. SCHMIDT

BY
FOWLER, KNOBBE & MARTENS
ATTORNEYS.

FAST FOURIER TRANSFORM COMPUTER AND METHOD FOR SIMULTANEOUSLY PROCESSING TWO INDEPENDENT SETS OF DATA

BACKGROUND OF THE INVENTION

A. Fourier Analysis

The frequency domain characteristics of a time domain waveform provide a powerful analytical tool in a variety of technical disciplines. The Fourier analysis of a given periodic function represents it as a sum of a number, usually infinite, of simple harmonic components. Because the response of a linear dynamic system to a simple harmonic input is usually easy to obtain, the response to an arbitrary periodic input can be obtained from its Fourier analysis. Likewise, the field of spectrum analysis, by providing a frequency domain representation of a waveform, facilitates identification of unknown waveforms.

B. The Fourier Transform

The Fourier transform, which is defined as follows:

1. $$A(f)=\int_{-\infty}^{\infty} X(t)e^{-i2\pi ft}dt$$

2. $$X(t)=\frac{1}{2\pi}\int_{-\infty}^{\infty} A(f)e^{i2\pi ft}df$$

where:

$A(f)$=the frequency domain function $X(t)$=the time domain function $i=\sqrt{-1}$ is a common mathematical tool for deriving the frequency domain function from a given time domain function and vice versa, i.e., given a particular mathematical function which defines the amplitude variations of a waveform with time, equation (1) above may be utilized to determine the various frequency components of the time domain function. The Fourier transform depends upon the underlying realization that any periodic amplitude function in the time domain may be constructed by superimposing a variety of sine and cosine functions in the time domain, each of these functions having a predetermined amplitude.

Early attempts to mechanize the Fourier transform utilized analog techniques which consisted primarily of the application of a time domain waveform to a series of bandpass filters, such that the response from each of the filters was indicative of the amplitude of the frequency domain components of the time domain function within a given frequency band width. Because of the requirement for a large number of filters, in order to cover a broad over-all pass band while maintaining the pass bands of the individual filters reasonably narrow, such techniques were notable for their high equipment cost. These costs were reduced through the use of a number of analog techniques, including the reiteration of a given time sample through a single bandpass filter, while changing the center frequency of the filter for each iteration, thereby allowing one filter to selectively sample for a plurality of frequency components. This reiteration, however, required additional time, and the input waveform could be sampled only once during each of the relatively long reiteration periods.

C. The Discrete Fourier Transform

Early attempts to use digital techniques for determining the frequency domain function corresponding to a time domain waveform utilized the discrete Fourier transform which allows frequency domain components to be derived from a set of periodic discrete amplitude samples of an input time domain waveform. These techniques were likewise limited to a periodic sampling of the input waveform, but the speed of digital calculation allowed a reduction of the sampling period from that required by analog techniques. The analogous discrete Fourier transform pair that applies to sampled versions of the functions given in equations (1) and (2) can be written in the following form:

3. $$A(r)=\frac{1}{N}\sum_{k=0}^{N-1} X(k)e^{\left(\frac{i2\pi rk}{N}\right)}$$

4. $$X(k)=\sum_{r=0}^{N-1} A(r)e^{\left(\frac{i2\pi rk}{N}\right)}$$

where:

$A(r)$=the $r^{th}$ coefficient of the frequency domain function $X(k)$=the $k^{th}$ coefficient of the time domain function Since the discrete Fourier transform samples must be taken during a predetermined time period, the input time domain waveform is assumed to be periodic in the time domain, and to have a period which is equal to the sampling time, i.e., the errors introduced by truncating the time domain waveform are assumed to be negligible. In fact, these errors are often not negligible, and numerous techniques have been utilized to diminish the effect of the time domain truncation, such as the superimposition upon the time domain samples of a cosine-squared function, which is commonly termed "-hanning," in order to smooth the transition into and out of the time sampling period.

In order to accomplish the discrete Fourier transform of equation (3) or the inverse discrete Fourier transform of equation (4), the equations (3) and (4) require $N^2$ computations, each computation including a multiplication and an addition. For a reasonably precise transform, such as one where $N$=2048, the computations exceed 4,000,000, and therefore either an excessive amount of hardware is necessary, or an unreasonably long time is required to complete the computation if the same hardware handles successive computations.

D. The Fast Fourier Transform Algorithm

A Fast Fourier Transform algorithm was derived by J. W. Cooley and J. W. Tukey and initially published in Mathematics of Computation, Volume 19, pages 297 to 301, April, 1965. This algorithm recognizes the similarities in a number of the $N^2$ multiply and add computations of the discrete Fourier transform, and utilizes these similarities to reduce the total number of computations required to calculate the discrete Fourier transform. By using the Fast Fourier Transform algorithm outlined by J. W. Cooley and J. W. Tukey, the computations are reduced from $N^2$ operations to $N/(2)\log_2 N$ complex multiplications, $N/(2)\log_2 N$ complex additions, and $N/(2)\log_2 N$ complex subtractions. For $N$=2,048, for example, this represents a computational reduction of more than 400 to 1 over the direct discrete Fourier transform computations.

SUMMARY OF THE INVENTION

The present invention involves special purpose computing equipment which is utilized to perform the Fast Fourier Transform algorithm. Data is taken from a serial access memory, operated on, and transferred to another serial access memory in such a manner that, after a given number of such transfers have taken place, the Fast Fourier Transform algorithm is completed for the data. Since each calculation of the Fast Fourier Transform algorithm requires a combination of two input coefficients, it is necessary to access two coefficients out of one such serial access memory, or alternatively, to access one coefficient from each of two serial access memories. Similarly, each such calculation produces two output coefficients which may likewise be addressed serially to one serial access memory, or addressed in parallel to the input of two serial access memories. It has been found advantageous, in order to keep the coefficients in the proper order within the serial access memories after each pass, to access coefficients from two serial access memories and place the results of the calculations performed on these coefficients into one serial access memory; or, alternatively, to access one serial access memory for two input coefficients and to place the results from this calculation in parallel in two serial access memories. Such a transition from one to two memories requires that the rates at which coefficients are clocked through the serial access memories be changed by a factor of two.

By using special computer configurations, the present invention recognizes that the serial access memories during the processing of one Fast Fourier Transform algorithm are only half full, and, by properly sequencing the events within the serial access memories, allows two Fast Fourier Transform algorithms to be calculated simultaneously, thus doubling the speed at which a given number of such algorithms may be performed. These and other features of the present invention are best described in reference to the attached drawings in which.

DETAILED DESCRIPTION OF THE PREFERRED EMBODIMENT

A. The Fast Fourier Transform Algorithm

Figure 1:
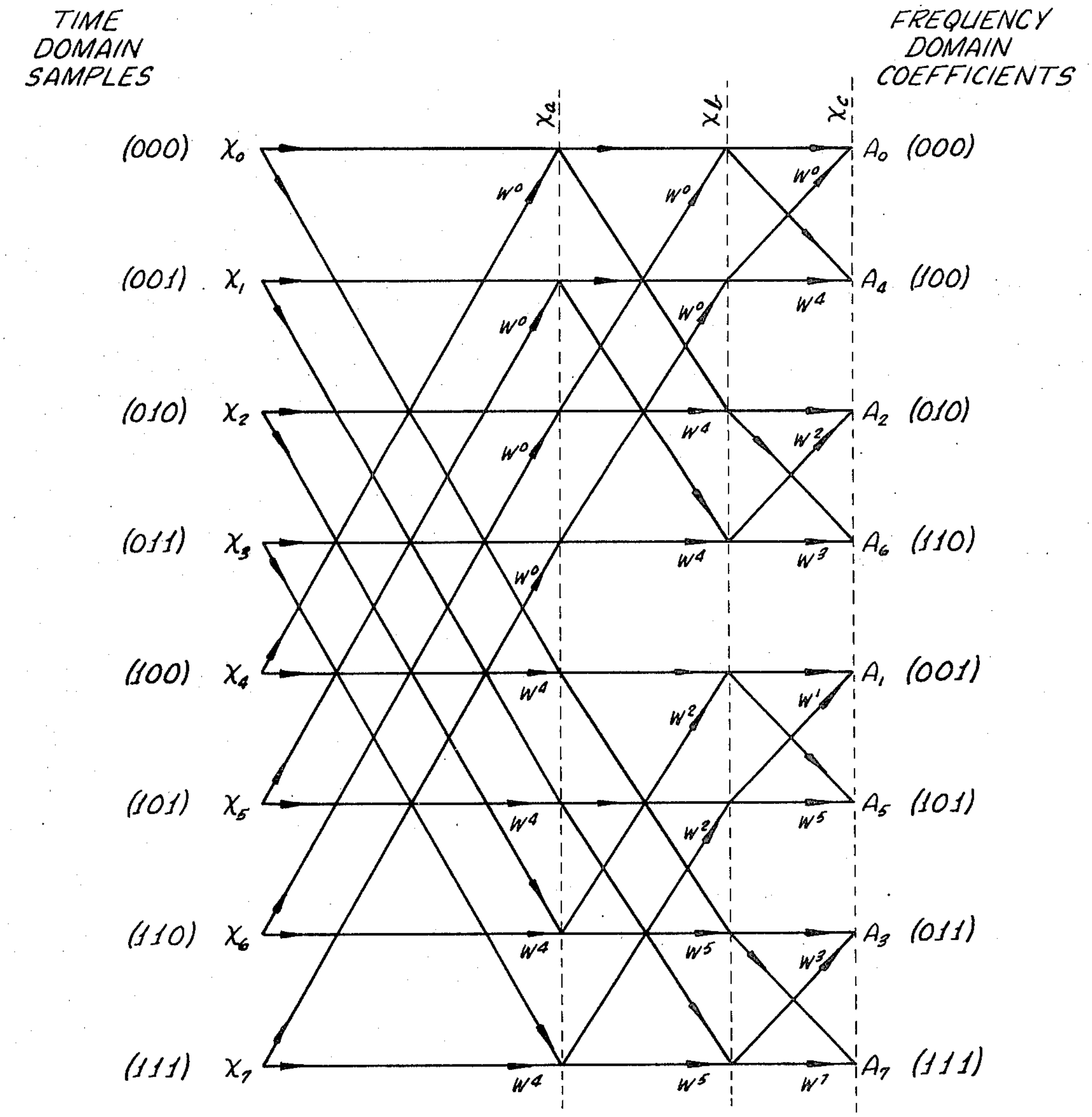
FIG. 1. PRIOR ART
FIG. 1 is a computational flow chart for the normal ordered fast Fourier algorithm when $N=8$.

In 1965 a paper was published by J. W. Cooley and J. W. Tukey which described an algorithm for rapidly calculating the discrete Fourier transform. This algorithm was adaptable to digital computation of the transform, and reduced the discrete Fourier transform of equations (3) and (4) to a series of sums. The derivation of this algorithm is briefly described as follows:

By defining:

$$W=c(i2\pi/N) \qquad (5)$$

equations (3) and (4) become:

6. $$A(r)\frac{1}{N}\sum_{k=0}^{N-1}X(k)W^{rk}$$

7. $$X(k)=\sum_{k=0}^{N-1}A(r)W^{-rk}$$

where:

$r=0,1,\ldots,N-1$ $K=0,1,\ldots,N-1$

It should be noted that the discrete fourier transform expression is complex, and that it is therefore possible to transform two series of time samples simultaneously, treating one of these series as the real part and the other series as the imaginary part of the complex expression. It is likewise possible to transform $2N$ samples with the expression defined in equations (3) and (4) by handling the even numbered samples as the real part of the complex transform and the odd numbered samples as the imaginary portion of the complex transform. Thus, for example, a 2,048 point transform can be performed as a 1,024 point ($N=1024$) complex transform.

When $r$ and $k$ are defined using binary notation, and when, for example, $N$ equals 8, $r$ and $k$ can be defined as follows:

$$r=4r_2+2r_1+r_o \qquad (8)$$

$$k=4k_2+2k_1+k_o \qquad (9)$$

where:

$r=0,1,\ldots,7$ $k=0,1,\ldots,7$ $r_2,r_1,r_o,k_2,k_1,k_o=0$ or 1 only

This definition will, of course, change as the value of $N$ changes. For example, for $N=64$, $r=32r_5+16r_4+8r_3+4r_2+2r_1+r_0$.

Using this notation for $N=8$, equation (6) becomes:

10. $$A(r_2,r_1,r_0)=\frac{1}{N}\sum_{k_0=0}^{1}\sum_{k_1=0}^{1}\sum_{k_0=0}^{1}X(k_2,k_1,k_0)W^{(4r_2+2r_1+r_0)(4k_2+2k_1+k_0)}$$

Figure 7:
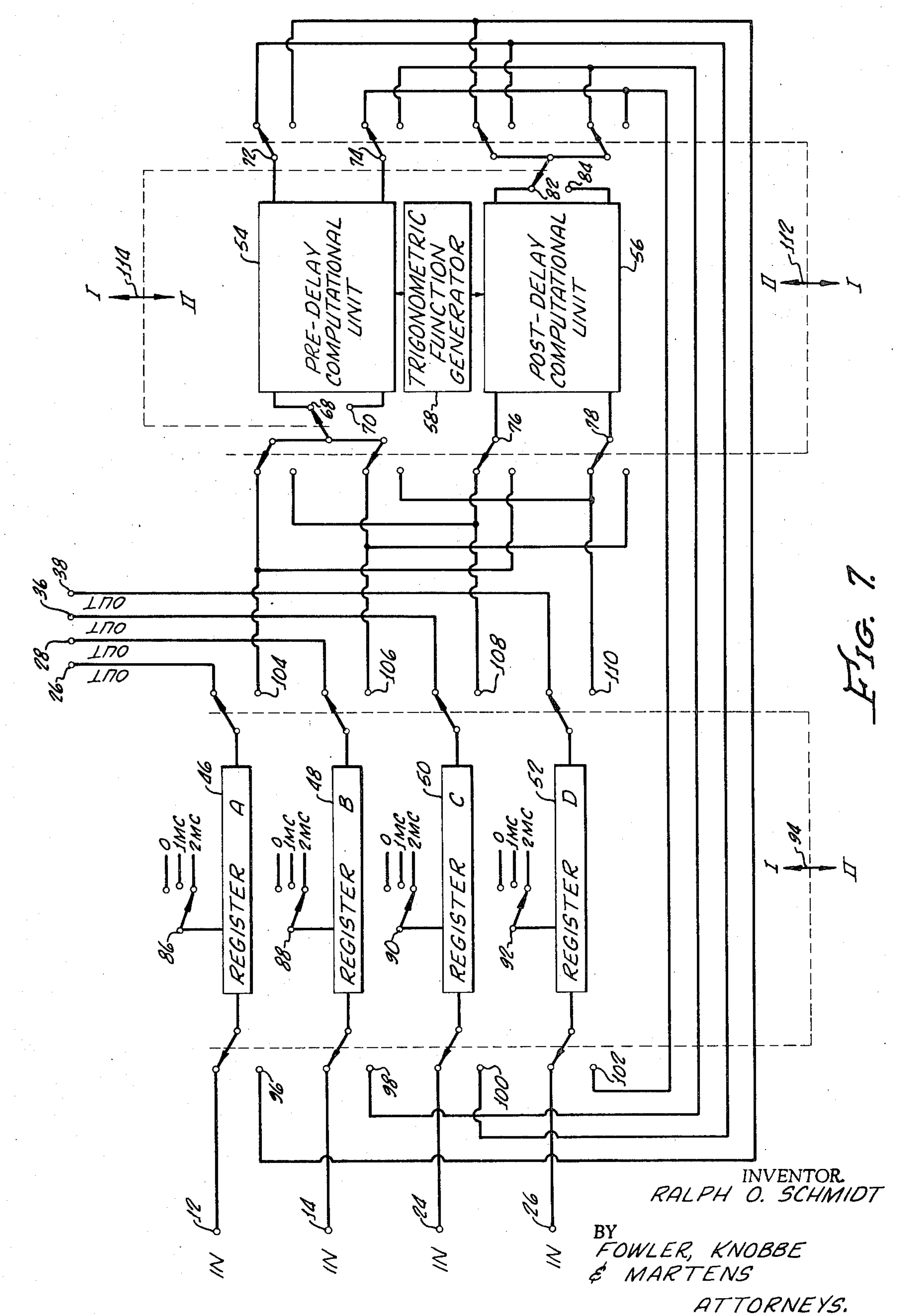

FIG. 7 is a detail block diagram of the arithmetic unit of this invention; and since: $W^{(Z+Y)}=W^ZW^Y$ equation (10) may be written as follows:

11. $$A(r_2,r_1,r_0)=\frac{1}{N}\sum_{k_0=0}^{1}\sum_{k_1=0}^{1}\sum_{k_2=0}^{1}X(k_2,k_1,k_0)W^{(4r_2+2r_1+r_0)4k_2}W^{(4r_2+2r_1+r_0)2k_1}W^{(4r_2+2r_1+r_0)k_0}$$

FIG. 8 is a time sequence chart for events occurring in the arithmetic unit of FIG. 7.

The individual terms of equation (11) can be written in the following form:

$$W^{(4r_2+2r_1+r_0)4k_2}=[W^{8(2r_2+r_1)k_2}]W^{4r_0k_2} \quad (12)$$

$$W^{(4r_2+2r_1+r_0)2k_1}=[W^{8(r_2)k_1}]W^{(2r_1+r_0)2k_1} \quad (13)$$

$$W^{(4r_2+2r_1+r_0)k_0}=W^{(4r_2+2r_1+r_0)k_0} \quad (14)$$

Note, however, that, due to the definition of $W$ in equation (5),

15.
$$\left[e^{\left(\frac{-2\pi i}{8}\right)}\right]^8=e^{-2\pi i}=1$$

Thus, the bracketed portions of equations (12) and (13) can be replaced by a one. It should be noted that, as $N$ changes, equation 15 will change, but that a number of terms of the equations will equal 1 regardless of the value of $N$. Therefore, equation (10) can be written in the following form:

16.
$$A(r_2, r_1, r_0)=\frac{1}{N}\underbrace{\sum_{k_0=0}^{1}\underbrace{\sum_{k_1=0}^{1}\underbrace{\sum_{k_2=0}^{1} X(k_2, k_1, k_0)W^{4r_0k_2}}_{X_a}W^{(2r_1+r_0)2k_1}}_{X_b}W^{(4r_2+2r_1+r_0)k_0}}_{X_c}$$

In this form, each of the summations can be separately performed, and only the results of the last summation must be saved. Thus, equation (10) can be performed as the series of successive summations shown below:

17.
$$X_a=\sum_{k_2=0}^{1} X(k_2, k_1, k_0)W^{4r_0k_2}$$

18.
$$X_b=\sum_{k_1=0}^{1} X_aW^{(2r_1+r_0)2k_1}$$

19.
$$X_c=\frac{1}{N}\sum_{k_0=0}^{1} X_bW^{(4r_2+2r_1+r_0)k_0}$$

$$A(r_2,r_1,r_0)=\hat{X}_c \quad (20)$$

where $X_a$ is the first summation, $X_b$ is the second summation and $X_c$ is the third summation. These three successive summations or passes serve to compute the value of $A(r)$ when $N$ is equal to 8. In a similar manner, greater numbers of successive summations will compute the value of $A(r)$ for larger values of $N$. For example, when $N$=1024, ten successive summations will compute the value of $A(r)$.

Figure 2:
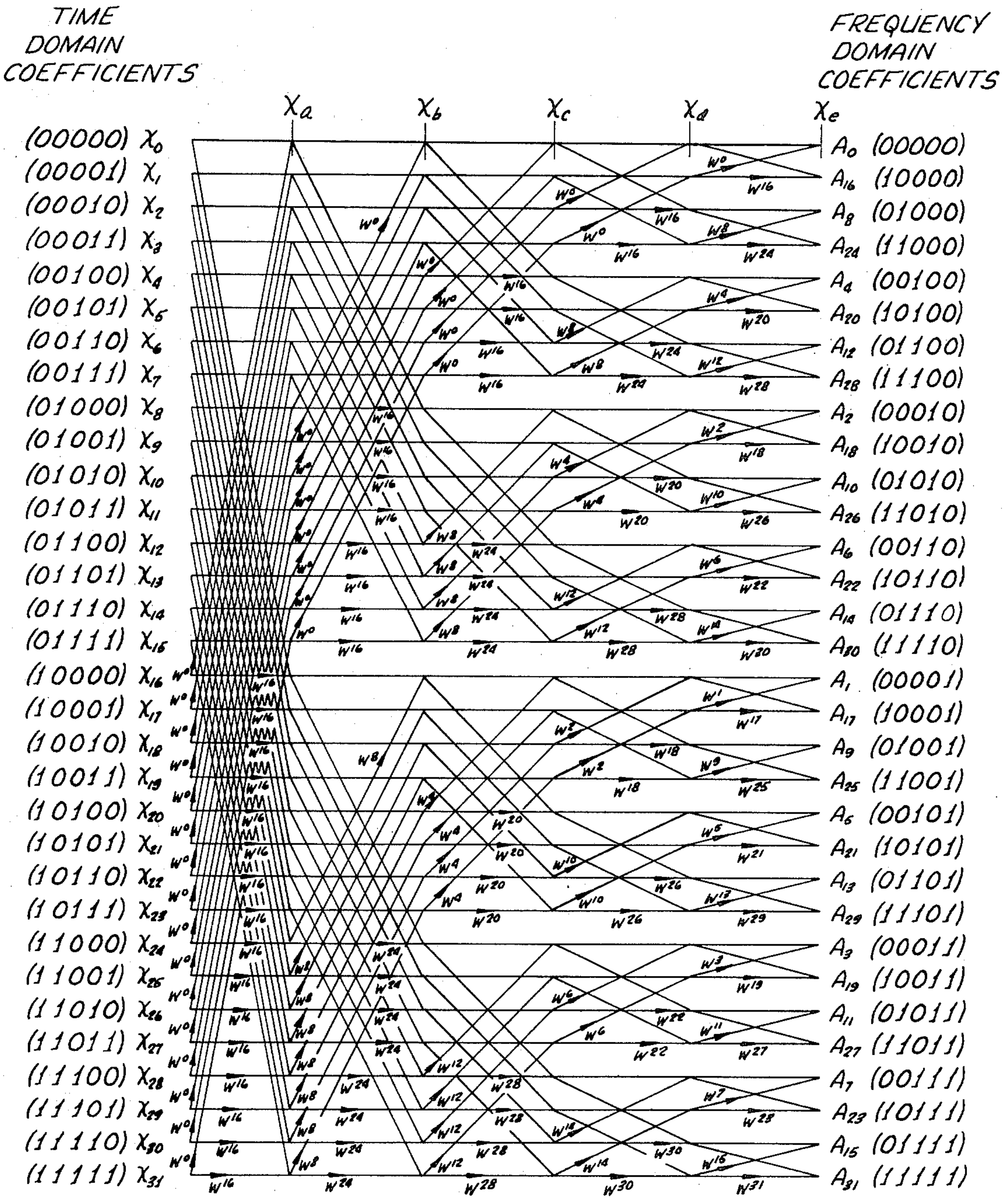
FIG. 2. PRIOR ART
FIG. 2 is a computational flow chart for the normal ordered fast Fourier algorithm when $N=32$.

The summations shown in equations 17 through 19 are diagrammed in FIG. 1 wherein $X_0$ through $X_7$ denote periodic consecutive time sample pairs corresponding to the amplitude of a function to be transformed. The first time sample of each pair is treated as the real part of the complex coefficient while the second sample is treated as the imaginary part. These coefficients correspond to binary notation coefficients 000 through 111, as shown in FIG. 1. The first summation, $X_a$, requires $k_2$ to change from 0 to 1, so that periodic time coefficients which are four samples, or $N/2$ apart are summed. The results of the first summation appear as binary coefficients along the line $X_a$ in FIG. 1. Successive summations $X_b$ and $X_c$, in turn, require $k_1$ and $k_0$, respectively, to change from 0 to 1, so that coefficients resulting from the previous summation which are two coefficients, or $N/4$, and one coefficient, or $N/8$, apart, respectively, are summed. The results of the summations $X_b$ and $X_c$ appear as binary coefficients along the lines $X_b$ and $X_c$ in FIG. 1. Regardless of the value of $N$, the first summation will always involve the combination of samples which are $N/2$ samples apart, the second summation $N/4$ apart, and so on until enough passes have been completed so that adjacent coefficients are combined. For example, FIG. 2 shows that for $N$=32, samples which are 16, 8, 4, 2 and 1 apart are combined, so that five successive summations are required for $N$=32. As shown in FIG. 1, the binary coefficients of $A(r)$ are not reordered, as shown in equation (20); rather, the output frequency domain coefficients in FIG. 1 occur as ordered in equation (19), i.e. in reverse binary order from $A_0$ to $A_7$, or, in binary notation, from 000 to 111. Similarly, the output coefficients in FIG. 2 occur in reverse binary order from 00000 to 11111. Reverse binary order is defined as the order achieved when the order of the binary digits of words in normal sequential order is reversed, i.e., 110 becomes 011, so that for $N$=8 the third coefficient appears where the sixth coefficient would appear if the order were normal, or for $N$=32, 01100 (12) becomes 00110 (6).

The $W$ notation in FIGS. 1 and 2 denotes the power to which $W$ is raised for each of the calculations involved in the summations $X_a$, $X_b$ and $X_c$. Thus, in FIG. 1, it can be seen that for the production of the first binary coefficient of $X_a$, the complex coefficient $X_0$ is combined with the complex coefficient $X_4$ after the coefficient $X_4$ is multiplied by $W^0$. Similarly, for the production of the frequency domain coefficient $A_2$, the third coefficient of $X_b$ is combined with the fourth coefficient of $X_b$ multiplied by $W^2$. It should be noted that each time a pair of coefficients is combined to produce a new pair of coefficients, the combination requires a complex multiplication, a complex addition and a complex subtraction. For example, in the combination of input coefficients $X_0$ and $X_4$ to produce the first and fifth coefficients of $X_a$, $X_0$ is combined with $X_4$ multiplied by either $W^0$ or $W^4$. From equation (5), when $N$=8, $W^0$ is the negative of $W^4$, so that it is necessary to multiply $X_4 \times W^0$ only once, and then add and subtract the product from $X_0$ to produce the two coefficients of $X_a$. This negative relationship holds true for $W^1 = W^5$, $W^2 = W^6$ and $W^3 = W^7$ when $W = 8$. Similarly, in FIG. 2, when $W$=32, $W^0 = W^{16}$, $W^1 = W^{17}$, $W^2 = W^{18}$, etc.

B. Reverse Binary Order Algorithm

Figure 3:
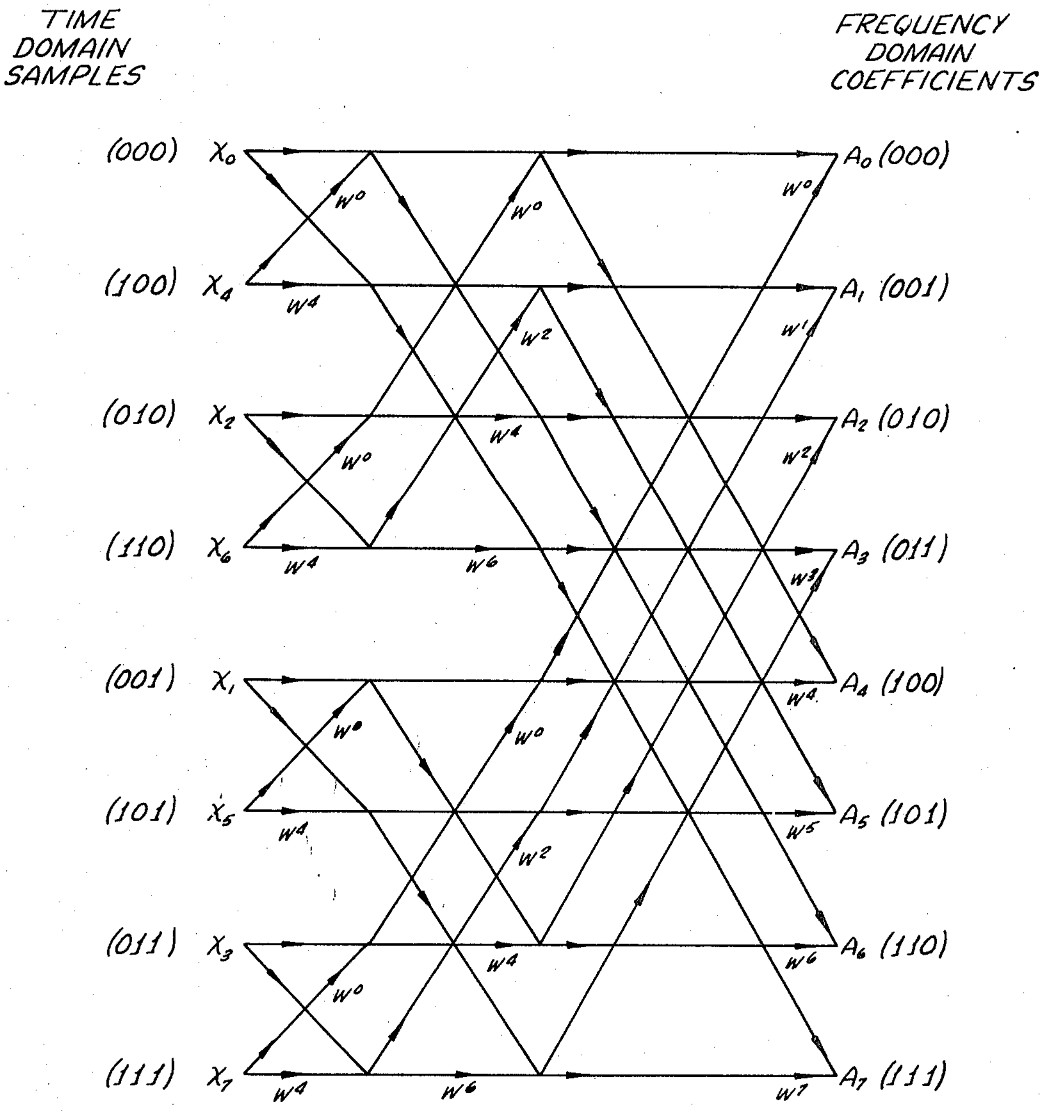
FIG. 3. PRIOR ART
FIG. 3 is a computational flow chart for the reverse binary ordered fast Fourier algorithm when $N=8$.

FIG. 3 shows the computational flow diagram for the algorithm explained above wherein the input samples are in inverse binary order rather than the normal order. It can be seen that when the input samples are in reverse binary order, the first summation or pass of the algorithm requiring samples which are separated by four coefficients when $N$=8, appear adjacent one another. Therefore, the first pass in the algorithm utilizing reverse binary ordered input coefficients combines adjacent samples. Similarly, the second pass combines samples which are separated by two coefficients and the last pass to produce $X_c$ combines samples which are four coefficients apart, these being adjacent coefficients in a normal ordered pattern. The algorithm of FIGS. 1 and 3 are identical, and the actual calculations which are carried out combine the same coefficients. The only thing which has been changed is the order in which the input coefficients appear. It will be noted from FIG. 3 that when the input data samples are in reverse binary order, the output appears in normal order. It should be noted that, regardless of the value of $N$, reverse binary order always requires that adjacent samples be combined initially and that for each pass thereafter, samples which are separated by twice the number of coefficients as the separation in the previous pass are combined.

C. System Block Diagram

Figure 4:
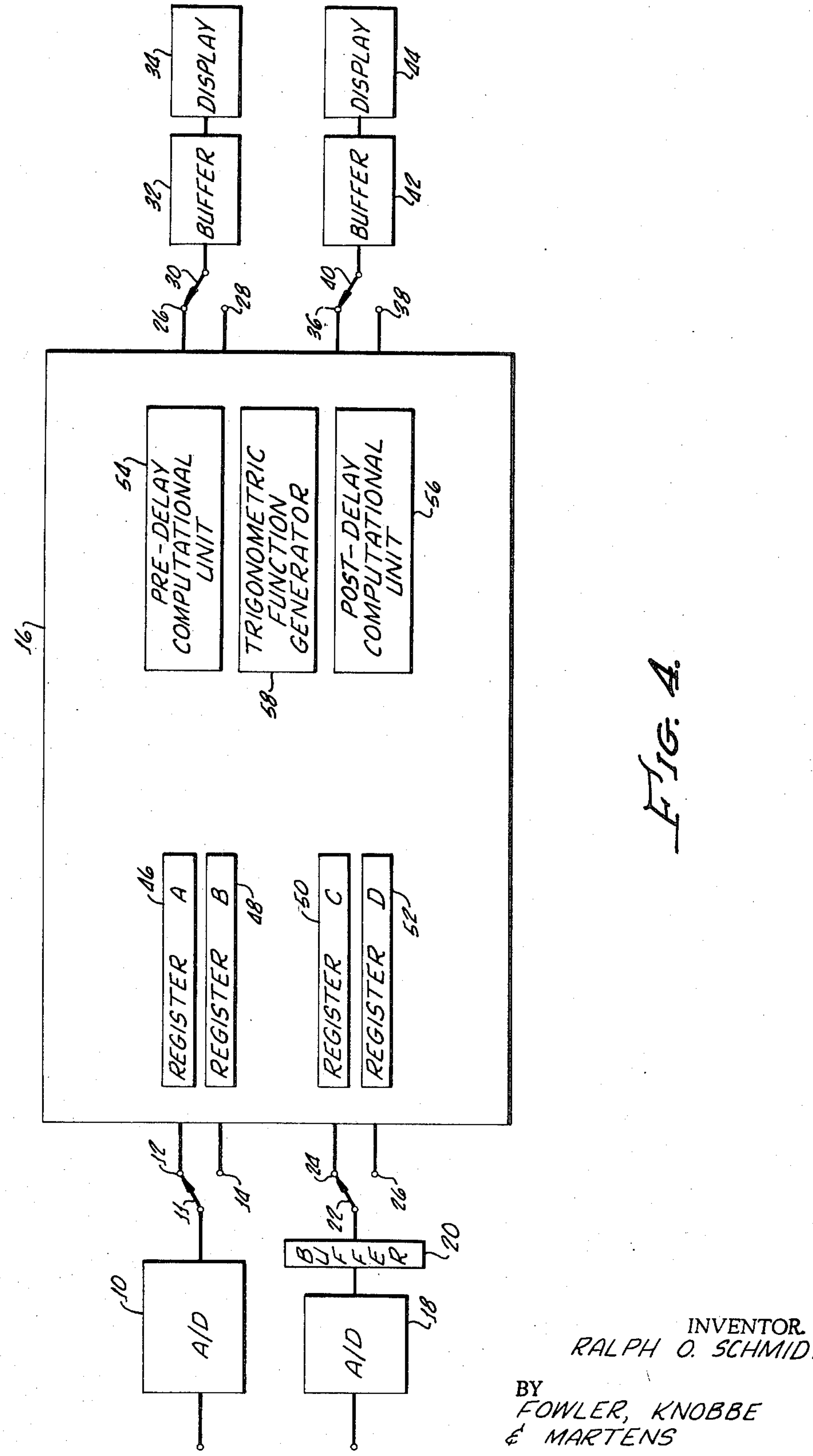
FIG. 4 is an overall block diagram of the computer of this invention.

Referring to FIG. 4, the preferred embodiment of the Fast Fourier Transform analyzer of the present invention is shown in block diagram form. Input analog data is coupled to an analog-to-digital convertor 10. Examples of such input data include unknown waveforms which are identifiable from their frequency components and waveforms which are to be applied to known systems to facilitate a predetermination of system reaction to the waveform. This input data is in the form of a continuous analog signal, the frequency domain function of which is to be determined. The analog-to-digital converter 10 periodically samples the input analog waveform and produces output digital data in binary form corresponding to the amplitude of the input analog signal at a particular time. The frequency at which the input analog signal is sampled should be at least twice the highest frequency component which is expected in the input analog waveform, in order to achieve a complete set of output frequency coefficients. Such samples are known as Nyquist samples. The output from the analog-to-digital converter 10 is therefore typically in word-serial form, i.e., the output of the analog-to-digital converter 10 is a sequence of binary coded amplitude words, each successive word being equivalent to the amplitude of the input signal at a particular time. Each of these binary words is, in addition, made up of a plurality of binary bits. These binary bits may appear at the output of the analog-to-digital converter 10 in bit-serial form on one wire, or in bit-parallel form, i.e., simultaneously on a plurality of wires.

The output of the analog to digital convertor 10 is coupled to a switch 11 which toggles between two input points 12 and 14 of an arithmetic unit 16. As input data is sampled by the analog digital converter 10, an arbitrary starting point is selected for the initial set of $N$ time samples which make up the input for the first algorithm. The first $N/2$ samples are addressed to the input 12 of the arithmetic unit 16 by the switch 11. The switch 11 then toggles so that the $(N/2+1)$th word and the remainder of the input words are applied to the input 14 of the arithmetic unit 16. The data which is coupled to the switch 11 from the analog digital convertor 10 is in the normal sampling order and therefore appears in normal binary order at the input to the arithmetic unit 16. A second analog digital convertor 18 similarly samples an input analog waveform to produce time samples in digital form relating to the amplitude of the input waveform. The output of the analog digital convertor 18 is coupled to a buffer storage 20 which serves to store the input data until a set of $N$ coefficients have been accumulated. The buffer 20 is then programmed to couple to a switch 22 the $N$ input samples in reverse binary order. As with the switch 11, the switch 22 toggles between two input points 24 and 26 of the arithmetic unit 16. The first $N/2$ samples in the reverse binary order pattern being addressed to the input 24 and the second $N/2$ sample being addressed to the input 26. The sampling of the input analog waveform by the analog to digital convertor 18 leads the sampling by the analog digital convertor 10 such that, as the first sample in the reverse binary order pattern is addressed from the buffer 20 to the switch 22, the first sample in normal border is addressed from the analog to digital convertor 10 to the switch 11. That is, the timing sequence at the input is arranged in such a way that the $N$ data words are addressed to the switches 11 and 22 simultaneously from each of the input lines.

The arithmetic unit 16 computes a first Fast Fourier Transform algorithm on the data available at inputs 12 and 14 and simultaneously computes a second Fast Fourier Transform algorithm on the data available at inputs 24 and 26. The results of the first transform appear on two outputs 26 and 28 of the arithmetic unit 16. These outputs result from the normal ordered inputs at 12 and 14 and are, therefore, in reverse binary order. The first $N/2$ output coefficients appear on the output 26, and sequentially thereafter the second $N/2$ outputs in reverse binary order appear at the output 28. A switch 30 toggles between the points 26 and 28 to access all of the output points from this first Fast Fourier Transform algorithm to a buffer 32, which properly aligns the coefficients for coupling to a display system 34.

Similarly, the outputs of the reverse binary ordered transform appear at outputs 36 and 38 of the arithmetic unit 16 in normal binary order. A switch 40 toggles between these points to access serially all of the output data to a buffer 42, which properly aligns the output coefficients for application to a display system 44. The display systems 34 and 44 serve to visually present the frequency coefficients resulting from the Fast Fourier Transform algorithms and may be, by way of example, CRT's or plotter systems. The analog to digital convertors 10 and 18, the buffers 32 and 42 and the displays 34 and 44 are well known in the digital computer art.

The arithmetic unit 16, as shown in FIG. 4, comprises four registers, Register A 46, Register B 48, Register C 50 and Register D 52. The arithmetic unit 16 also includes a pre-delay computational unit 54 and a post-delay computational unit 56. In addition, the arithmetic unit 16 comprises a trigonometric function generator 58, which is utilized to derive various powers of $W$ in the equations derived above. Since the powers of $W$ which are required are predeterminable, the generator 58 may be a read only memory, common in the computer art, which is designed to permanently store the trigonometric functions equivalent to the powers of $W$.

D. The Shift Registers

The registers 46 through 52 are the preferred embodiment of a serial access memory which is $N/2$ words long and may be clocked so that data words are advanced through the register. The rate at which the register is clocked is required to be changeable by a factor of 2 without lag. In the preferred embodiment, MOS shift registers are used, and they are clocked alternately at rates of 1 megacycle or 2 megacycles. In the sequence of events through which the arithmetic unit 16 proceeds, the registers are also required to hold data which has been shifted into them for a period of time. That is, no clock pulse is addressed to the registers during a multi-microsecond period.

E. Pre-Delay Computational Unit

Figure 5:
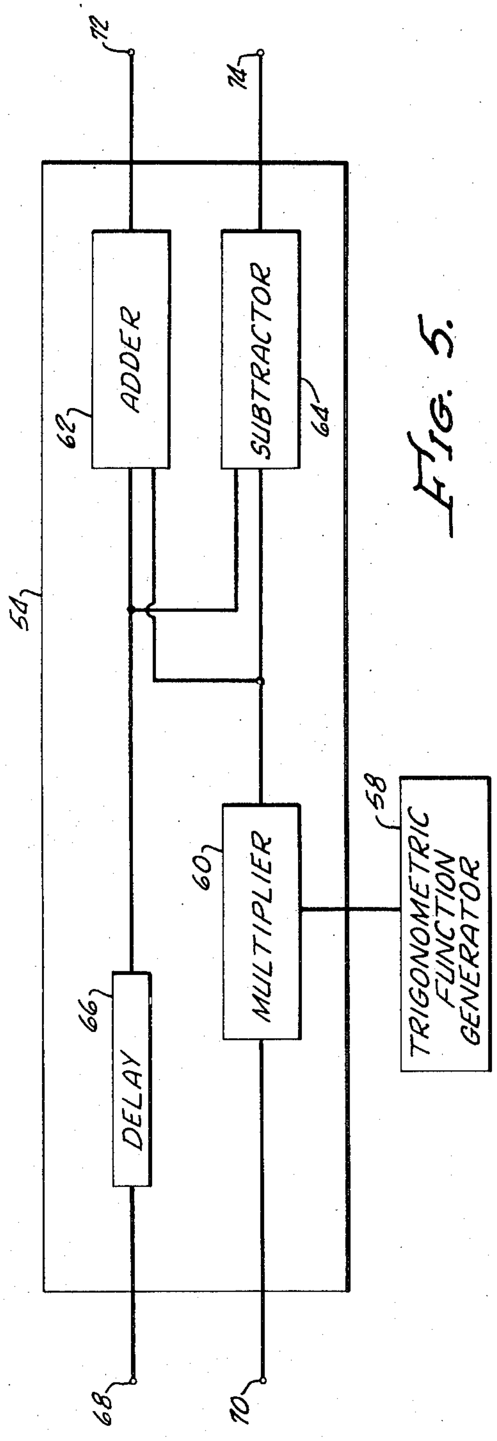
FIG. 5 is a detail block diagram of the pre-delay computational unit of this invention.

The pre-delay computational unit 54 is shown in the block diagram of FIG. 5. This computational unit 54 is designed to combine two coefficients in any pass of the Fast Fourier Transform algorithm by first multiplying one of the coefficients in a multiplier 60 by a power of $W$, which is derived from a trigonometric function generator 58. The product from the multiplier 60 is then coupled to an adder 62 and a subtractor 64 which, respectively, add and subtract the product from the multiplier 60 to the second coefficient. This pre-delay computational unit 54 includes a delay 66 which interposed in an input line from an input point 68 to which one of the input coefficients to be calculated is addressed. The other input coefficient is addressed to an input point 70 and is applied immediately to the input of the multiplier 64 without an interposed delay. The computational unit 54 is particularly designed to compute a fast Fourier combination of two input coefficients which are serially available from a serial access memory, one input coefficient arriving sequentially after the other input coefficient. Since the time required for the multiplier 60 to multiply the input coefficient from the input point 70 with a power of $W$ from the trigonometric function 78 is short in comparison with the time required to shift a coefficient from the serial access memory, and since both the adder 62 and the subtractor 64 require that their inputs be presented simultaneously, the delay 66 delays the first coefficient by a sufficient amount so that the serially available coefficients at point 68 and 70 arrive at the adder 62 and subtractor 64 simultaneously for combination. The outputs from the pre-delay computational unit 54 appear simultaneously at the points 72 and 74 and, in the organization of the computer, these coefficients are designed to be presented to two different serial access registers such that they may be simultaneously registered without the need for delaying one of these output coefficients.

F. Post-Delay Computational Unit

Figure 6:
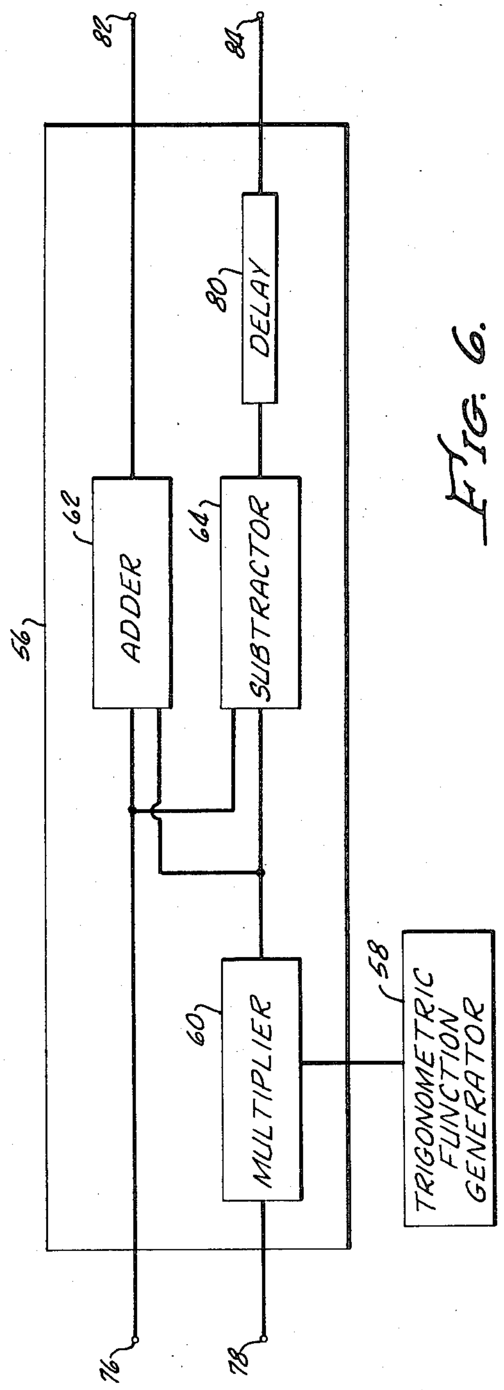
FIG. 6 is a detail block diagram of the post-delay computational unit of this invention.

The post-delay computational unit, which is diagrammed in FIG. 6, includes a multiplier 60, trigonometric function generator 58, adder 62 and subtractor 64 in an identical arrangement with the pre-delay computational unit 54. However, the post delay computational unit 56 is designed to read two input coefficients at its input points 76 and 78 simultaneously, from the output of two serial access memories, and therefore, no delay must be interposed at the input. However, the output of the post delay computational unit 56 is designed to address one serial access memories to place both the output coefficient from the adder 62 and the output coefficient from the subtractor 64, in sequence, in one register. Therefore, the output from the subtractor 64 is interposed by a delay 80 so that the output from the adder 62, which appears at the output point 82, may be addressed to the serial access memory before the output from the subtractor at the output point 84.

G. Detailed Description of the Arithmetic Unit

The arithmetic unit 16 is shown in the detailed block diagram of FIG. 7. The sequence of events which occurs within the arithmetic unit 16 is charted in FIG. 8, and the following discussion will, therefore, be directed to both FIGS. 7 and 8.

In addition to the registers 46 through 52, the computational units 54 and 56, and the trigonometric function generator 58 explained above, the arithmetic unit 16 includes an array of switches which properly circulate coefficients through the arithmetic unit 16 to complete the fast Fourier algorithm. A series of single-pole triple-throw switches 86, 88, 90 and 92 serve to connect the clocking input to the registers 46 through 52 to either a 1 megacycle clock signal, a 2 megacycle clock signal or no clock signal. These signals are produced by an external source. FIG. 8 shows the sequence of events which occur with time in the arithmetic unit 16 during the simultaneous calculation of a normal ordered and reverse ordered Fast Fourier Transform algorithm where both of the algorithms calculate eight output frequency domain coefficients for eight input time domain samples. The time column of FIG. 6 is numbered in one-half microsecond intervals, such that the total calculation time period requires 40 such intervals or 20 microseconds. The clock rates for the various registers are also shown for the different periods of time during the calculation. For example, register A 46 is clocked at a 2 megacycle rate during the first four ½ microsecond intervals and is clocked at a zero rate during the second four ½ microsecond intervals.

The registers 46 through 52 have a $N/2$ word length for an $N$ point Fast Fourier Transform algorithm, and, therefore, in FIG. 8, each of the registers is broken down into four word positions, word A through word D. Since these registers are serial access memories, data must be inputted into the word A position initially, and this word, upon each clock pulse, will sequence through the register. For example, once a word is in the word A position and a clock pulse is received, this word will be advanced to the word B position. Likewise, a word in the word D position will be outputted from the register when a clock pulse is received.

An eight-pole double-throw switch 94, shown in FIG. 7, is used to address the inputs of each of the registers 46 through 52 to the input points 12, 14, 24 and 26 of the arithmetic unit 16; or, in the alternative, to a plurality of points 96, 98, 100 and 102 which are derived from the output of the computational units 54 and 56. The switch 94 likewise conducts the output from the registers 46 through 52 to either the output points 26, 28, 36 and 38, or to a plurality of points 104, 106, 108 and 110, which are connected to the inputs of the computational units 54 and 56. As can be seen from FIG. 8, the switch 94 is in position 1 only during the initial eight one-half microseconds, and the final eight ½ microsecond periods, which is the time during which data is inputted to, and outputted from, the arithmetic unit 16. During the remainder of the sequence; that is, between time periods 8 and 32, the switch 94 is in position 2, so that data within the arithmetic unit 16 may be recirculated for the plurality of computations.

The arithmetic unit 16 shown in FIG. 7 includes an additional eightepole double-throw switch 112, which, in position 2, connects the input of the pre-delay computational delay unit 54 to the output of registers A 46 and B 48, and the output of the pre-delay computational unit 54 to the input of registers C 50 and D 52. Likewise, with the switch in position 2, the inputs to the post-delay computational unit 56 are connected to the outputs of the registers C 50 and D 52, and the outputs of the computational unit 56 are connected to the inputs of the registers A 46 and B 48. With the switch 112 in position 1, the inputs to the computational unit 54 are connected to the output of the registers C 50 and D 52 and the outputs of the computational unit 54 are connected to the inputs of the registers A 46 and B 48. Likewise, with the switch 112 in position 1, the inputs to the computational unit 56 are connected to the outputs of the registers A 46 and B 48, while the outputs of the computational units 56 are connected to the inputs of the registers C 50 and D 52. The position of the switch 112, therefore, selects one of the computational units 54 or 56 to be connected at its input to the registers A 46 and B 48 and its outputs to the registers C 50 and D 52, and the other one of the computational units 54 and 56 to be connected at its inputs to the registers C 50 and D 52, and at its outputs to the registers A 46 and B 48. It can be seen from FIG. 8 that the switch 112, during the ½ microsecond time periods 9 through 16, for example, is in position 1, and during the microsecond time periods 17 through 24, is in position 2.

As explained above in reference to the computational units 54 and 56, the pre-delay computational unit 54 requires that data from one of the registers 46 through 52 be serially applied to its two inputs 68 and 70. A double-pole double-throw switch 114 is used to toggle the input between the points 68 and 70 at the proper time. Likewise, the outputs from the post-delay computational units 56 produce, in sequence, two output coefficients which, as explained above, must be applied in series to a given register, 46 through 52. This same switch 114 toggles between the outputs 82 and 84 to properly address the series output of the computational unit 56. As shown in FIG. 8, the switch 114 toggles to alternate positions on each succeeding ½ microsecond period during the computation.

The time sequence of FIG. 8 shows the calculations which are preformed on a pair of eight point input data sets. The first set, designated $X_0$ through $X_7$, is available in normal binary order. The second set, $A_0$ through $A_7$, is available in reverse binary order. Coefficients resulting from the first, second and third pass of the algorithm conducted on the data in normal binary order are labeled $X_{A0}$ through $X_{A7}$, $X_{B0}$ through $X_{B7}$, and $A_0'$ through $A_7'$ respectively. Likewise, the coefficients resulting from the first, second and third pass of the Fast Fourier Transform algorithm conducted on the input data which is in reverse binary order are labeled $A_{A0}$ through $A_{A7}$, $A_{B0}$ through $A_{B7}$, and $X_0'$ through $X_7'$ respectively.

Referring now to FIGS. 7 and 8, the sequence of events which occurs in the arithmetic unit 16 to perform these algorithms will be described. During the initial eight ½ microsecond periods, data is read into the registers 46 through 52 from the input points 12, 14, 24 and 26. Initially, the registers A 46 and C 50 are clocked at a 2 megacycle rate, and the switch 94 is in position 1, so that data at points 12 and 24 is clocked into the registers A 46 and C 50 at a 2 megacycle rate. During the time period 5 through 8, the registers B 48 and D 52 are clocked at a 2 megacycle rate with the switch 94 still in position 1, so that the latter half of the 8 input time samples for each of the algorithms is clocked into these registers at a 2 megacycle rate. It will be noted that the registers B 48 and D 52 are not clocked during the initial four ½ microsecond periods, and the registers A 46 and C 50 are, likewise, not clocked during the time periods 5 through 8, so that the data is clocked only into the proper register. During the time period 9 through 12, the registers A 46 and B 48 are clocked at a 1 megacycle rate, while the register C 50 is clocked at a 2 megacycle rate, and the register D 52 is not clocked. The switch 94 has been placed in position 2 so that output coefficients will be recirculated, and the switch 112 is in position 1 so that the samples $X_0$ and $X_1$ are serially addressed from the register A 46 to the input 76 of the post-delay computational unit 56, and the samples $X_4$ and $X_5$ are serially addressed from the register B 48 to the input 78 of the post-delay computational unit 56. These inputs are therefore presented in the proper order for computation, $X_0$ arriving with $X_4$ and $X_1$ arriving with $X_5$. The outputs from the post-delay computational unit 56 are serially addressed through the toggling of the switch 114 to the input of the register C 50 at a two megacycle rate in the order $X_{A0}$, $X_{A4}$, $X_{A1}$, $X_{A5}$. It will be noted that the output of the post-delay computational unit 56 is also applied to the input of the register D 52, but, as this register is not being clocked during the time periods 9 through 12, the output data from the computational unit 56 is addressed only to the register C 50. It can therefore be seen that we are emptying two registers 46 and 48 at a 1 megacycle rate to fill one register 50 at a 2 megacycle rate. During this same period of time, the register C 50 is being emptied at a 2 megacycle rate, and since the switch 112 is in position 1 output data from the register C 50 is applied to the input of the pre-delay computational unit 54. This input data, which involves the coefficients $A_0$, $A_4$, $A_2$ and $A_6$, is addressed to the inputs 68 and 70 of the computational unit 54, alternatively, such that the inputs $A_0$ and $A_2$ are addressed to the input 68 and $A_2$ and $A_6$ are addressed to the input 70 through the toggling of the switch 114. The computational unit 54 will combine these input coefficients to produce at its output 72 the coefficients $A_{A0}$ and $A_{A2}$, and at its output 74 the coefficients $A_{A4}$ and $A_{A6}$. Since the switch 112 is in position 1, these output coefficients are addressed in parallel to the registers A 46 and B 48 at a one megacycle rate, the coefficients $A_{A0}$ and $A_{A2}$ being addressed to the register A 46, and the coefficients $A_{A4}$ and $A_{A6}$ being addressed to the register B 48. We are therefore emptying register C 50 at a two megacycle rate to fill the registers A 46 and B 48 in parallel at a 1 megacycle rate. During subsequent time periods, the sequence of events shown in FIG. 8 continues to produce, by the same process as that described for time period 9 through 12, the coefficients of $X_b$, A', $A_B$ and X'. It will be noted that during the time period 33 through 40, the switch 94 is in position 1 and data is clocked to the outputs 26, 28, 36 and 38 of the arithmetic unit 16 at a 2 megacycle rate.

As an over view, it can be seen from FIG. 8 that coefficients are transferred back and forth between the registers A 46, B 48 and the registers C 50, D 52 at alternate clock rates such that two algorithms may be simultaneously performed within the register space required for one transform, thereby utilizing the registers 46 through 52 at maximum capacity. The normal ordering of one transform and reverse binary ordering of the other transform makes this efficient use possible, since the data in the reverse binary order transform must be accessed from one file in series to achieve the proper order for computation at a time when the data in the normal order algorithm must be accessed from two parallel registers to achieve the proper computational order.

Regardless of the number of input coefficients in each of the algorithms to be performed, so long as each of the algorithms include the same number of input coefficients, the apparatus which has been described will properly order the coefficients for each succeeding pass for both of the input algorithms, so long as one of the algorithms is in normal binary order and the other algorithm is in reverse binary order.

The switches which are utilized in the circuit of FIG. 7 are, in the preferred embodiment, diode switches which are driven from master timing clock. Such switches are well known in the computer art. Likewise, the adder 62, the subtractor 64, the multiplier 60, and the delays 66 and 80 are elements which are common in the computer arts. It can be seen that, in the system for which the time sequence is given in FIG. 8, the delays 66 and 80 must each be ½ microsecond delay lines in order to properly sequence the parallel coefficients into a ½ microsecond sequential order for two megacycle clocking in the various registers.

G. Simultaneous Forward and Reverse Transforms

It can be seen from FIG. 1 that when a normal order Fast Fourier Transform is conducted, the resulting frequency domain coefficients are presented in reverse binary order. It will also be noted from the similarity of the form of equations 3 and 4 above, that the format required for the calculation of the inverse Fast Fourier Transform algorithm is identical with the format required for the transform. The system which is described herein is therefore applicable for conducting normal ordered forward transform algorithms and simultaneously conducting reverse binary ordered inverse transformation algorithms. In the analysis of the waveforms with fast Fourier techniques, it is often advantageous to alter the frequency domain coefficients of a given time domain waveform as, for example, by superimposing the characteristics of a filter on the frequency domain coefficients, and to then conduct an inverse transform to determine what effect such filtering has on the time domain waveform. The system disclosed herein can therefore conduct a forward transform to present the frequency coefficients for alteration, and then conduct the inverse transform on the altered frequency coefficients, while at the same time processing the next sequential forward transform, without the requirement for additional register space for maintaining each of the transform coefficients during transformation.

H. 1,024-Point Transformations

The preferred embodiment of the present invention performs simultaneous normal and reverse ordered transformations on 1,024-point algorithms. The construction of such equipment is identical in principle with that shown for the eight-point algorithms.

What is claimed is:

1. A computer for the simultaneous calculation of the Fast Fourier Transform algorithm on two independent sets of data, one of said sets of data being in normal binary order, the other of said sets of data being in reverse binary order, comprising:
   - a plurality of serial access memories for temporarily storing the input and output data from said air of algorithms, as well as the intermediate coefficients of said algorithm;
   - means for stepping coefficients through each of said serial access memories at either a first or a second rate, said second rate being twice said first rate;
   - computing means for combining pairs of input coefficients according to said Fast Fourier Transform algorithm to produce output coefficients;
   - means for selectively connecting the input of said computing means to receive coefficients clocked from a pair of said serial access memories at said first rate; and
   - means for selectively connecting the output of said computing means to transmit coefficients to one of said serial access memories which is clocked at said second rate.

2. A computer as defined in claim 1 additionally comprising:
   - means for selectively connecting the input of said computing means to receive coefficients clocked from one of said serial access memories at said second rate; and means for selectively connecting the output of said computing means to transmit coefficients to two of said serial access memories which are clocked at said first rate.

3. A computer as defined in claim 2 wherein said computing means comprises:
   - first means for combining pairs of coefficients each of which are clocked from one of said serial access memories, said means comprising:
     - means for delaying one of each of said pairs of coefficients clocked from said one of said serial access memories; and
   - second means for combining pairs of coefficients from the output of two of said serial access memories, said second means comprising:
     - means for delaying selected portions of the output coefficients from said second means for combining so that said output is available for application to one of said serial access memories.

4. A computer as defined in claim 3 wherein each of said computing means additionally comprises:
   - means for generating a predetermined function;
   - means for multiplying said function by one of said pairs of input coefficients to produce a product;
   - means for adding the other of said pair of input coefficients to said product to produce an output sum; and
   - means for subtracting said product from the other of said pair of input coefficients to produce an output difference.

5. A computer as defined in claim 1 wherein each of said plurality of serial access memories temporarily stores coefficients from both of said two independent sets of data.

6. A Fast Fourier Transform algorithm computer comprising:
first and second pairs of serial access memories;
means for combining pairs of input coefficients in accordance with said algorithm to produce respective pairs of output coefficients;
means for clocking data through said serial access memories at a first or second rate; and
means for coupling coefficients clocked from the output of both of said first pair of memories at said first rate to a first pair of inputs of said combining means and coupling a first pair of outputs of said combining means to the input of one of said second pair of memories clocked at said second rate, while simultaneously connecting the output of said one of said second pair of memories to a second pair of inputs of said combining means and connecting a second pair of outputs of said combining means to the input of both of said first pair of memories.

7. A Fast Fourier Transform algorithms computer as defined in claim 6 wherein said means for combining comprises:
first calculating means comprising:
means for delaying one of said pairs of input coefficients prior to combining said pair, so that coefficients available in series may be combined; and
second calculating means comprising:
means for delaying one of said respective pair of output coefficients so that said output coefficients may be addressed serially to the input of said serial access memories.

8. A Fast Fourier Transform algorithm computer as defined in claim 7 wherein said first pair of inputs and outputs of said combining means are the inputs and outputs of said second calculating means and said second pair of inputs and outputs of said combining means are the inputs and outputs of said first calculating means.

9. A computer for the calculation of the Fast Fourier Transform algorithm comprising:
a plurality of serial access memories;
a computational unit for combining pairs of input coefficients which arrive in series from one of said serial access memories to produce output coefficients in parallel;
a computational unit for combining coefficients which arrive in parallel from a pair of said serial access memories to produce output coefficients in series, so that two simultaneous algorithms may be performed;
means for clocking said one of said serial access memories at a first rate; and
means for clocking said pair of said serial access memories at a second rate, said second rate being half of said first rate.

10. A computer for the calculation of the Fast Fourier Transform algorithm as defined in claim 9 wherein said one serial access memory receives said series output coefficients and said pair of serial access memories receive said parallel output coefficients.

11. A computer for calculating the Fast Fourier Transform algorithm comprising:
a plurality of serial access memories;
means for clocking said serial access memories to produce memory input and memory output date;
first means for combining said memory output data in coefficient pairs as required for said algorithm to produce memory input data in coefficient pairs, said combining means including a pre-computation delay for delaying one coefficient of each memory output data coefficient pair, with substantially no post-computational delay of said memory input data; and
second means for combining said output data in coefficient pairs as required for said algorithm, said combining means including a post-computational delay for delaying one coefficient of each memory input data coefficient pair, with substantially no pre-computational delay of said memory output data.

12. A computer for calculating the Fast Fourier Transform algorithm as defined in claim 11 wherein each of said means for combining comprises:
a function generator;
means for multiplying the output of said function generator by first selected portions of said memory output data to produce products;
means for adding second selected portions of said memory output data to said products to produce sums; and
means for subtracting said products from said second selected portions of said memory output data to produce differences.

13. A computer for calculating the Fast Fourier Transform algorithm as defined in claim 12 wherein said means for clocking clocks memory output data into said first means for combining, and memory input data out of said second means for combining at a first rate; and clocks memory output data into said second means for combining, and memory input data out of said first means for combining at a second rate; said second rate being half said first rate.

14. A computer for calculating the Fast Fourier Transform algorithm as defined in claim 11 additionally comprising switching means for alternatively connecting different ones of said plurality of serial access memories to each of said first and second combining means.

15. A computer for calculating the Fast Fourier Transform algorithm comprising:
first and second serial access memory pairs;
means for calculating the combinations required for said algorithm; and
means for alternatively connecting one memory of said first memory pair to the input of said calculating means while connecting the output of said calculating means to both memories of said second memory pair or connecting both memories of said first memory pair to the input of said calculating means while the output of said calculating means is connected to the input of said one memory of said second memory pair.

16. A method of calculating of the Fast Fourier Transform algorithm comprising:
storing coefficients for said algorithm in a plurality of serial access memories;
combining pairs of input coefficients which arrive in series from one of said serial access memories to produce output coefficients in parallel;
combining coefficients which arrive in parallel from a pair of said serial access memories to produce output coefficients in series;

storing said output coefficients in said plurality of serial access memories;

clocking said one of said serial access memories at a first rate; and clocking said pair of said serial access memories at a second rate, said second rate being half of said first rate.

17. A method of calculating of the Fast Fourier Transform algorithm as defined in claim 16 wherein said one serial access memory receives said series output coefficients and said pair of serial access memories receive said parallel output coefficients.

18. A method of calculating the Fast Fourier Transform algorithm in a computer which includes a calculator and a plurality of serial access memories, comprising:

storing coefficients of said algorithm in said plurality of serial access memories;

serially accessing data exclusively from the output of one of said plurality of serial access memories to said calculator while the output of said calculator in accessed in parallel to the inputs of two of said serial access memories; and calculating the combinations required for said algorithm in said calculator.

19. A method of calculating the Fast Fourier Transform algorithm as defined in claim 18 wherein said calculating step combines pairs of coefficients in accordance with said algorithm, said calculating step comprising:

delaying one of said pairs of said serially accessed date so that said serially accessed date is simultaneously available for calculation.

20. A method of calculating the Fast Fourier Transform algorithm as defined in claim 19 wherein said calculating step additionally comprises:

multiplying one of said pairs of simultaneously available date by a function to produce products;

adding said products to the other of said pairs of simultaneously available data to produce sums; and subtracting said products from said other of said pairs of simultaneously available date to produce differences.

21. A method of calculating the Fast Fourier Transform algorithm in a computer which includes a calculator and a plurality of serial access memories, comprising:

storing coefficients of said algorithm in said plurality of serial access memories;

simultaneously accessing data from the outputs of two of said plurality of serial access memories to said calculator while the output of said calculator is accessed, exclusively, in serial to the input of one of said serial access memories; and calculating the combinations required for said algorithm in said calculator.

22. A method of calculating the Fast Fourier Transform algorithm as defined in claim 21 wherein said calculating step produces pairs of simultaneously available output coefficients in accordance with said algorithm, said calculating step comprising:

delaying selected ones of said pairs of simultaneously available output coefficients to allow accessing of said output in serial.

* * * * *